United States Patent [19]

Maehara

[11] 4,360,237
[45] Nov. 23, 1982

[54] DECELERATION SENSING TYPE FLUID PRESSURE CONTROL DEVICE FOR VEHICLE BRAKE SYSTEM

[75] Inventor: Toshifumi Maehara, Hanazono, Japan

[73] Assignee: Akebono Brake Industry Co., Ltd., Tokyo, Japan

[21] Appl. No.: 207,777

[22] Filed: Nov. 17, 1980

[30] Foreign Application Priority Data

Nov. 22, 1979 [JP] Japan .................................. 54-151553
Mar. 6, 1980 [JP] Japan .................................... 55-28439
Jun. 3, 1980 [JP] Japan .................................... 55-74736

[51] Int. Cl.³ .............................................. B60T 8/14
[52] U.S. Cl. .................................. 303/6 C; 303/24 C; 303/24 F
[58] Field of Search ................... 303/6 C, 6 R, 24 A, 303/24 F, 24 C, 24 R, 84 A, 84 R, 22 R, 22 A; 188/349, 195

[56] References Cited

U.S. PATENT DOCUMENTS 2,118,390  5/1938  Aikman ..................... 303/24 A X
3,143,379  8/1964  Eksergian ..................... 303/24 F
3,741,610  6/1973  Holland ............................ 303/6 C Primary Examiner—Douglas C. Butler
Attorney, Agent, or Firm—Toren, McGeady & Stanger

[57] ABSTRACT

A deceleration sensing type fluid pressure control device for vehicle brake system having a control piston; a proportioning action mechanism capable of varying the reducing value of output pressure from input pressure in relation to a load imposed on the control piston; an adjusting piston one end of which is connected to a fluid pressure source through a passage arrangement; and a valve mechanism which is disposed in the passage arrangement and closes when the deceleration of the vehicle reaches a predetermined value. The fluid pressure control device is provided with a swaying lever which has a middle point thereof serving as a fulcrum. One end of the lever engages the control piston. Between the other end of the lever and the other end of the adjusting piston, there is provided a control spring which imposes the above stated load on the control piston.

5 Claims, 4 Drawing Figures

DECELERATION SENSING TYPE FLUID PRESSURE CONTROL DEVICE FOR VEHICLE BRAKE SYSTEM

BACKGROUND OF THE INVENTION

1. Field of the Invention

This invention relates to a fluid pressure control device of the deceleration sensing type adapted for use in a brake system for a vehicle.

2. Description of the Prior Art

It has been known that in applying the brake in a vehicle, the braking force to be applied to the rear wheels of the vehicle must be lower by a given degree than the braking force to be applied to the front wheels because of the difference between loads by which the front and rear wheels are pushed against the surface of a road. To meet this requirement, there have been provided various fluid pressure control device such as proportioning valves. In a conventional proportioning valve, there are provided a control piston which faces input and output fluid chambers with different fluid pressure receiving areas and a control spring which exerts a spring force on this control piston in the axial direction thereof toward the input fluid chamber. The rear wheel braking fluid pressure is slowly increased at a predetermined rate by counterbalancing the force of fluid pressure with this control spring. However, the control elements include only the fluid pressure and a spring force of a given magnitude. The conventional proportioning valve, therefore, has sometimes greatly deviated from an optimum ratio in which a braking force is to be allocated to the front and rear wheels.

To solve this problem, therefore, there have been made various contrivances for making the control characteristic of the fluid pressure control device of the above stated type variable in accordance with changes in the condition of loads imposed on a vehicle. This invention is directed to an improvement also in this respect.

SUMMARY OF THE INVENTION

It is thus a general object of the invention to provide a deceleration sensing type fluid pressure control device for a vehicle brake system in which the spring force of a control spring used for a proportioning valve is arranged to be variable utilizing the change that takes place in the value of a braking fluid pressure required for obtaining a given degree of deceleration during brake application according as the loaded condition of a vehicle changes. The variable range of the spring force is arranged to be relatively readily selectable according to the character of the vehicle.

In accordance with this invention, the fluid pressure control device includes a proportioning action mechanism in which a control piston faces an input fluid chamber with a fluid pressure receiving face of a smaller area and an output fluid chamber with a fluid pressure receiving face of a larger area. The control piston is urged by the spring force toward the output fluid chamber. The output fluid pressure is controlled to increase at a slower rate than the input fluid pressure by the movement of the control piston caused by fluid pressure against the spring force. The fluid pressure control device includes also a valve mechanism which is arranged such that occurrence of a given degree of deceleration during braking application to the vehicle causes the valve mechanism to close a fluid passage to shut off communication between one of the above stated input and output fluid chambers and an adjusting fluid chamber. The fluid pressure control device further includes a spring force applying mechanism having a lever which is arranged to transmit by a seesaw action the spring force of a control spring exerted on one end thereof to the above stated control piston which engages the other end thereof. The spring force applying mechanism is arranged such that a piston which has one end thereof face the above stated adjusting fluid chamber while the other end thereof engages a hold spring and the above stated control spring is arranged to be caused by the action of fluid pressure to move against the forces of these springs to change and increase the spring force of the control spring exerted on the lever. The invented device is a load responsive fluid pressure control device usable for double piping of a vehicle brake system.

The above and further object, features and advantages of the invention will become more apparent from the following detailed description of preferred embodiments thereof taken in connection with the accompanying drawings.

DETAILED DESCRIPTION OF PREFERRED EMBODIMENTS

Figure 1:
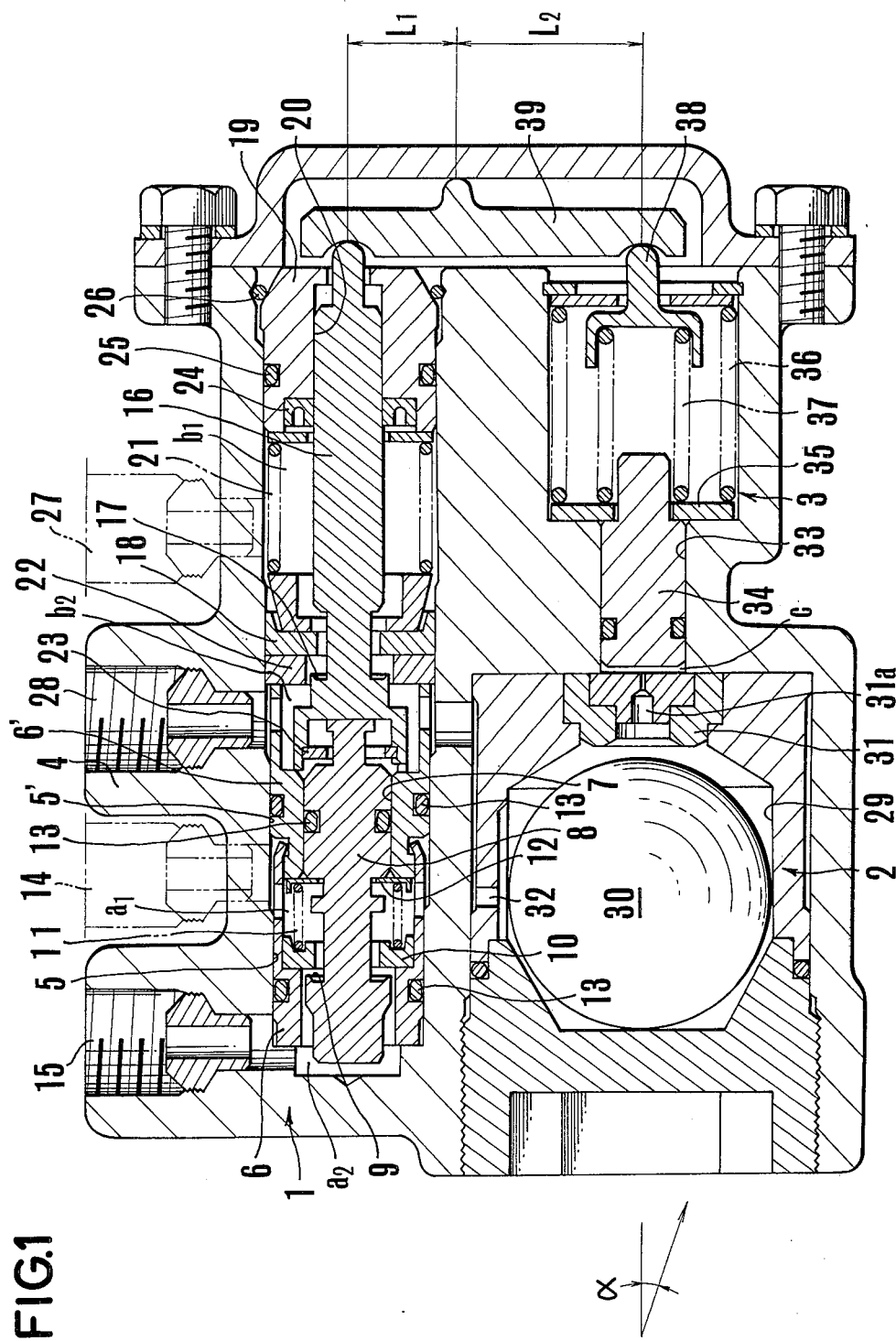
FIG. 1 is a longitudinal sectional view showing a fluid pressure control device as a first embodiment of the present invention.

In FIG. 1 which shows a first embodiment of the invention, there is provided a proportioning action mechanism 1 which is arranged to control two brake fluid channels A and B in an interlocking manner. The embodiment includes also a valve mechanism 2 which is arranged to close a fluid flow passage when the vehicle reaches a preset degree of deceleration. The embodiment further includes a spring force applying mechanism 3 which is arranged to apply the spring force of a control spring to a control piston of the above stated proportioning action mechanism through a force multiplying means. The value of the spring force is arranged to increase in proportion to the value of fluid pressure held within an adjusting fluid chamber when the valve mechanism comes to operate. The details of these mechanism are as described below:

Stepped cylinders 5 and 5' which are formed at a valve body 4 have tubular fail-safe pistons 6 and 6' which are formed in one unified body slidably engaging therewith. Inside of the tubular pistons 6 and 6', there is provided a middle cylinder 7 which has a balance piston 8 slidably engaged therewith. The inside of a valve chamber is divided into two fluid channels A and B with the balance piston 8 thus engaged with the middle cylinder 7. A valve seat 10 attached to the inside of the tubular fail-safe piston 6 further divides the divided chamber of the fluid channel A into an output fluid chamber $a_2$ which has the fore end head portion of the balance piston 8 facing it and an input fluid chamber $a_1$ into which the shaft portion of the balance piston 8 is inserted. Output fluid pressure $p_{a2}$ is arranged to be blocked from input fluid pressure $p_{a1}$ by engagement of the valve seat 10 with a valve body part 9 formed by the balance piston 8. There are provided a hold spring 11 of the valve seat 10; a stopper 12 which not only serves as spring seat but also serves to restrict the movement of the balance piston 8 relative to the fail-safe pistons 6 and 6′ in the axial direction thereof to a predetermined extent; a seal member 13; an input port 14 which connects the input fluid chamber $a_1$ to a master cylinder of the fluid channel A; and an output port 15 which connects the output fluid chamber $a_2$ to a rear wheel brake device of the channel A.

When in repose, the balance piston 8 is urged and biased to a left end position as shown in FIG. 1 by a spring force Fx which is exerted through a control piston 16. When an action of fluid pressure is exerted, since the sealing sectional area $A_1$ of the valve body part 9 is equal to the sectional area of the middle cylinder 7, balancing between the output fluid pressure $p_{a2}$ and the output fluid pressure $p_{b2}$ of the fluid channel B which will be described hereinafter causes the balance piston 8 to move to a given extent to come into contact with the valve seat 10. A fluid pressure control action is performed in this manner.

Meanwhile, the inside of the chamber of the fluid channel B which is the other of the two divided channels is further divided by a valve seat 18 into an output fluid chamber $b_2$ which has the fore end head portion of a control piston 16 facing it and an input fluid chamber $b_1$ which has the shaft portion of the control piston 16 inserted therein. A valve body part 17 which is formed at the control piston 16 and the valve seat 18 are arranged to engage with each other to block thereby an output fluid pressure $p_{b2}$ from an input fluid pressure $p_{b1}$. Further, the right end portion of the control piston 16 is slidably engaged with a cylinder 20 of a tubular member 19 fixedly attached to the inside of the valve chamber. The control piston 16 is urged by a spring force Fx of a control spring 37 through a lever 39. Further, the control piston 16 is connected to the balance piston 8 by a retainer ring 23 which permits these pistons 16 and 8 to move relative to each other to a given extent in the axial direction thereof. The sealing sectional area of the valve body part 17 is equal to the sealing sectional area $A_1$ of the valve body part 9 of the balance piston 8. The valve seat 18 is pushed against the end part of the fail-safe piston 6′ through a backing-up member 22 by the spring force of a hold spring 21. The valve seat 18 is thus arranged to have a gap between it and the valve body part 17 of the control piston 16 while it is in repose. The widthdrawable limit of the control piston 16 is defined by a stepped part of a tubular member 20.

There are further provided a piston cup 24; seal ring 25; a stopper 26; an input port 27 which connects the input fluid chamber $b_1$ to a master cylinder of the fluid channel B; and an output port which connects the output fluid chamber $b_2$ to a rear wheel brake device of the fluid channel B.

During brake application of the vehicle, a ball 30 which is arranged to be guided on a guide face provided at an angle of elevation $\alpha$ to the advancing direction of the vehicle and which is thus arranged to abut upon a valve seat 31 as it moves by inertia when there takes place a given degree of deceleration. A flow passage 31a is arranged to be closed by the abutment of this ball 30 upon the valve seat 31. Further, the flow passage 31a is arranged to connect the output fluid chamber $b_2$ of the above stated fluid channel B to an adjusting fluid chamber C of the spring force applying mechanism. In this particular embodiment, the spring force applying mechanism includes a cylinder 33; an adjusting piston 34 which has one end thereof face the above stated adjusting fluid chamber C while the other end thereof has a spring seat 35 attached thereto; a hold spring 36 which is stretched between this spring seat 35 and the valve body 4 and is arranged to push the piston 34 toward the adjusting fluid chamber C; and a control spring 37 which engages the spring seat 35 and also engages through another spring seat 38 with the lower end of a lever 39. Meanwhile the upper end of the lever 39 engages the right end of the control piston 16. The lever 39 is arranged to transmit the spring force of the control spring 37 to the control piston 16 by swaying on the fulcrum 40 thereof.

Such being the structural arrangement, the spring force Fx to be transmitted through the lever 39 to the control piston 16 increases with the control spring 37 compressed by the movement of the adjusting piston 34. The degree of this increase of the spring force Fx is determined by the relation of the force of the fluid pressure to be applied to the piston 34 to the spring force of the hold spring 36. The lever 39 is arranged to be of a lever ratio of $L_2/L_1 > 1$. Assuming that the spring force of the spring 37 is F and a force to be exerted on the control piston 16 is Fx, there obtains the following relation: $Fx = FL_2/L_1$.

The fluid pressure control device which is arranged as described in the foregoing operates in the following manner: At the initial stage of brake application, the input fluid pressures $p_{a1}$ and $p_{b1}$ are transmitted as they are to the rear wheel brake device through the output fluid chambers $a_2$ and $b_2$. At this moment, the fluid pressure force of the balance piston 8 is balanced in the axial direction while, as for the fluid pressure on the control piston 16, the fluid pressure force exerted on the sectional area $A_2$ of the cylinder 20 in the rightward direction comes to increase. Accordingly, when there obtains a relation of $Pc = Fx/A_2$ through balancing with the force Fx which is exerted in the leftward direction, the second control piston 16 comes to move to the right as viewed on FIG. 1. Then, the valve body part 17 comes to abut on the valve seat 18 to block the communication between the input and output fluid chambers $b_1$ and $b_2$. After that, the output fluid pressure $p_{b2}$ comes to slowly increases in relation to the input fluid pressure $p_{b1}$ at a rate of $\tan \theta = (A_1 - A_2)/A_1$.

Further, in response to the slow increase of the output fluid pressure $p_{b2}$ of the fluid channel B, the balance piston 8 comes to slowly increase the output fluid pressure $p_{a2}$ in relation to the input fluid pressure $p_{a1}$.

With regard to the relation described in the foregoing, the feature of the embodiment lies in that the force Fx to be exerted on the control piston 16 is arranged to increase in proportion to the value Ph of the fluid pressure held at the adjusting fluid chamber C by the action of the valve mechanism. In other words, the break point value Pc of the output fluid pressure control is in a proportional relation to the value of the force Fx. However, in the case of this embodiment, the value of the force Fx is in the following relation:

$Fx = F_0 + kPh$, in which $F_0$ represents the initial spring force of the spring 37.

The braking fluid pressure (i.e. the hold fluid pressure Ph) required for obtaining a given degree of deceleration at which the valve mechanism 2 closes the flow passage 31a during brake application is proportional to the amount of a live load on the vehicle. Therefore, the force Fx to be exerted on the control piston 16 increases according as the amount of the live load on the vehicle increases. With arrangement made in this manner, the varying rate of the force Fx can be readily changed by changing the value of k in the formula $Fx=F_0+kPh$ shown in the foregoing in accordance with a change in the curve of the optimum braking force allocation which varies with the kind of the vehicle. The value of k can be determined by suitable selection of the diameter of the piston 34, the spring force and the spring constant of the hold spring 36, and the lever ratio of the lever 39.

In the case of the proportioning action mechanism of this particular embodiment, when the fluid channel A becomes inoperative, the movement of the control piston 16 relative to the balance piston 8 is released by the ring 23 from the fluid control. When the other fluid channel B becomes inoperative, the control piston 16 and the fail-safe pistons 6 and 6' move to the right as viewed on the drawing with these parts retained in the illustrated relation. Then, they are locked by the stepped part of the tubular member 19 through the control piston 16 and are thus released from the fluid pressure control. In other words, when one of the two channels A and B fails to operate, the rear wheel braking fluid pressure of the normally operating channel is always kept at the same degree of pressure with the input fluid pressure, so that the braking force for the whole vehicle can be prevented from becoming insufficient.

As described in the foregoing, the fluid pressure control device of the present invention has the following advantages: The spring force which determines the break point value in the fluid pressure control of the proportioning action mechanism can be increased in proportion to the amount of the live load on the vehicle. Besides, the rate of this increase is readily changeable in designing by selecting and setting the diameter of the piston 34, the spring force of the hold spring 36, etc. Therefore, the embodiment can be adapted for a wide range of vehicles of varied characteristics.

The lever is used to multiply the force of the spring 37 before it is applied to the piston 16. This arrangement permits designing to make the spring 37 smaller, so that the size of the whole device can be made compact. Further, although this embodiment has been described as applied to a double piping system, it goes without saying that the device of the present invention is applicable also to a single piping system.

Figure 2:
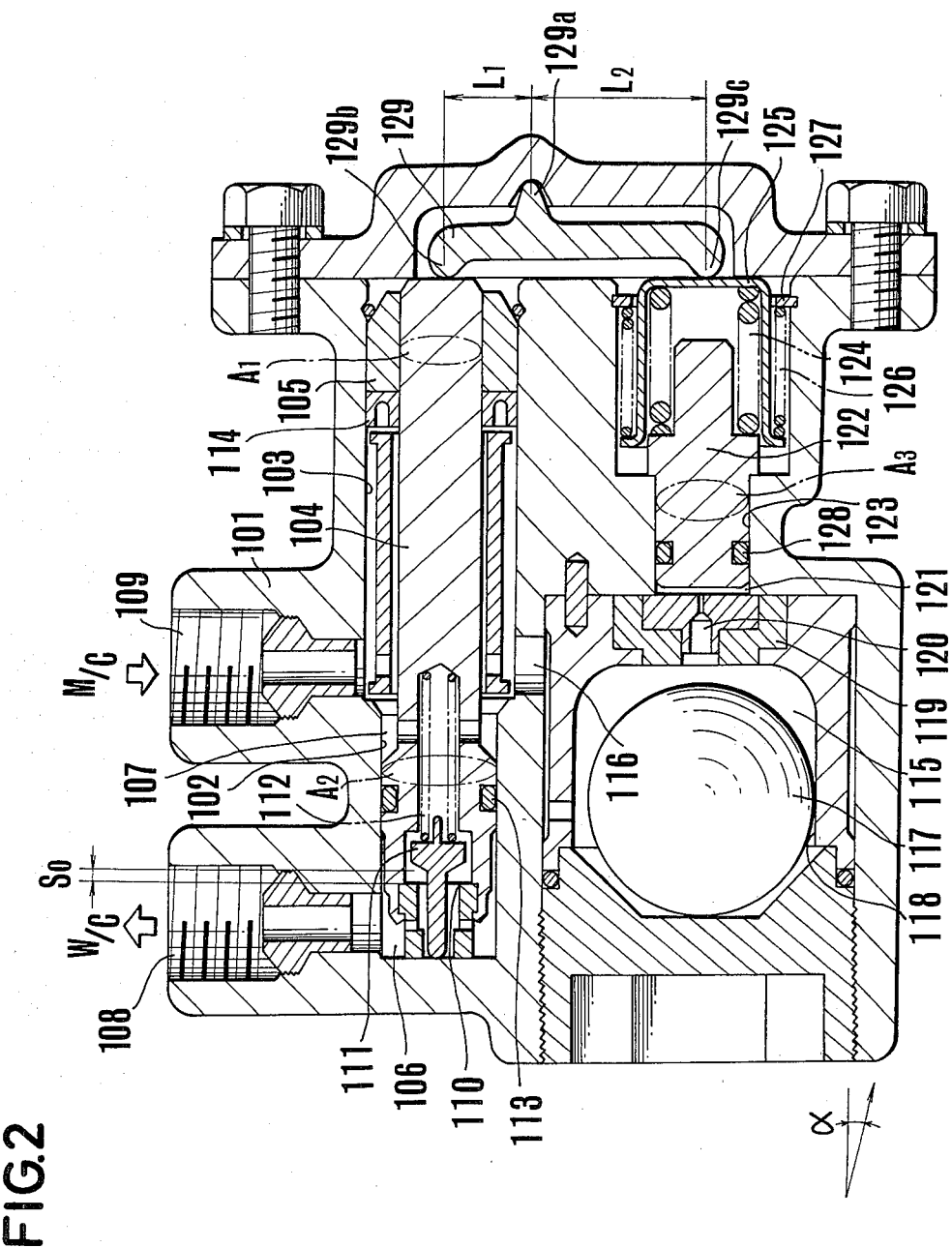
FIG. 2 is a longitudinal sectional view showing a second embodiment of the invention.

A second embodiment of the invention is as shown in FIG. 2, which shows a valve body 101 which contains a proportioning valve device in the upper part thereof and a valve mechanism and a control spring force applying mechanism in the lower part thereof; stepped cylinders 102 and 103; and a control piston 104 which has its left end portion slidably engaging the cylinder 102 having a smaller diameter and has its right end portion slidably piercing through a cylinder member 105 which is slidably engaging the cylinder 103 having a larger diameter. Meanwhile, one end 129b of a lever 129 which is employed as force multiplying means is arranged to abut upon the right end face of the control piston 104. By this, the control piston 104 is pushed and biased toward an output fluid chamber 106. The shaft portion of the control piston 104 at the stepped parts of the stepped cylinders 102 and 103 is located in an input fluid chamber 107. The output fluid chamber 106 is arranged to communicates with a rear wheel brake device through an output port 108. The input fluid chamber 107 is arranged to communicate with a master cylinder which is a fluid pressure source through an input port 109.

These input and output fluid chambers 106 and 107 are connected to each other through a check valve mechanism which is disposed inside of the control piston 104. This check valve mechanism includes a valve seat 110, a valve body 111 and a pushing spring 112. Normally, or under a non-brake applying condition, the check valve mechanism opens a fluid flow passage with the fore end of its valve body 111 remaining in engagement with the side wall of the cylinder 102. When a fluid pressure action causes the control piston 104 to move to the right, or toward the input fluid chamber 107, the valve body 111 comes to abut upon the valve seat 110 to close the flow passage thereby. After that, the flow passage is opened and closed according as the control piston 104 moves back and forth due to fluid pressure balancing across the control piston 104.

There are also provided a seal member 113 which seals the part between the input and output fluid chambers 106 and 107; and a piston cup 114 which prevents the fluid from leaking toward the cylinder member 105.

The proportioning valve mechanism is arranged as described in the foregoing. Assuming that the sectional areas at which the control piston 104 slidably engages with the cylinder member 105 and the cylinder 102 are $A_1$ and $A_2$ ($A_1 < A_2$) and that the pushing force exerted on the control piston 104 through the lever 129 is Fx, the proportioning valve mechanism causes output fluid pressure $P_0$ to slowly increase in response to the input fluid pressure $P_i$ in the following relation:

Break point value $Pc = Fx/A_1$

Rate of slow increase $\tan\theta = (A_2 = A_1)/A_2 < 1$

This proportioning valve mechanism may be replaced with a different mechanism that is arranged to operate in the same manner.

A reference numeral 115 indicates a valve chamber which is communicating with the above stated input fluid chamber 107 through a flow passage 116; 117 indicates a ball; and 118 indicates a guide face which is arranged to guide the movement by inertia of the ball 117. The guide face 118 is provided at an angle of elevation $\alpha$ to the advancing direction of the vehicle as indicated by an arrow mark in FIG. 2. A numeral 119 indicates a valve seat which is arranged to close a flow passage 120 when the ball 117 which is movable by inertia comes to abut thereon. The flow passage 120 is arranged to normally have the valve chamber 115 communicate with an adjusting fluid chamber 121. The G valve mechanism which is arranged as described in the foregoing may be replaced with a known solenoid valve mechanism. The adjusting fluid chamber 121 is formed by an adjusting cylinder 123 which has an adjusting piston 122 slidably engaged therewith. The adjusting piston 122 has its left end portion face the above stated adjusting fluid chamber 121 while the right end portion thereof is engaged with one end of a control spring 124.

The control spring 124 is enclosed with a cap-shaped spring case 125. The other end of the control spring 124 engages the bottom part of the spring case 125. The cap-shaped head portion of the spring case 125 engages the lower end 129c of a lever 129. The spring force of the control spring 124 is thus arranged to be transmitted to the lever 129. There is also provided a hold spring 126 which is stretched between the flange provided in the left end of the spring case 125 and a stopper ring 127 which is attached to the valve body 101. The spring case 125 is urged by this hold spring 126 in the direction opposite to the control spring 124. A numeral 128 indicates a seal member. The spring force of the hold spring 126 is weaker than that of the control spring 124.

Assuming that the distance from the fulcrum protrusion 129a of the lever 129 to the upper end 129b and the distance from the fulcrum protrusion to the lower end 129c thereof are $L_1$ and $L_2$ ($L_1 < L_2$), the lever 129 is arranged to transmit the urging spring force of the control spring 125 to the control piston 104 by multiplying the force at a rate of $L_2/L_1 > 1$. It is a feature of this embodiment that the spring force applying mechanism is arranged in this manner. The arrangement will be understood from the following detailed description: The pushing force Fx of the lever 129 on the control piston 104, which determines the break point value Pc as mentioned in the foregoing, is obtained in value that is $L_2/L_1$ ($>1$) times as great as a pushing force exerted on the lower end 129c of the lever 129. This pushing force on the lower end 129c of the seesawing lever 129 is exerted at a value obtained from the balance of the right and left counteracting forces as expressed below:

$F_A + K_A \cdot S$ (rightward force) $F_B$ (leftward force)

Therefore, $F_A + K_A \cdot S - F_B$ wherein,
$F_A$: The initial spring force of the control spring 124
$F_B$: The initial spring force of the hold spring 126
$K_A$: The spring constant of the control spring
S: The extent of displacement of the adjusting piston 122.

Now, let us assume that the sectional area of the adjusting piston 122 which is in slidable engagement with the adjusting cylinder 123 is $A_3$. Since, the adjusting piston 122 is arranged to move to the right as viewed on the drawing while thus compressing the control spring 124 according as the fluid pressure Ph of the adjusting fluid chamber 121 increases, the $F_A + K_A \cdot S$ in the above given formula can be replaced with $Ph \cdot A_3$. Further, let us assume that the extent of movement of the control piston 104 required for having the valve body 111 of the proportioning valve mechanism come to abut upon the valve seat 110 thereof is $S_0$, the pushing force Fx exerted on the control piston 104 through the seesawing lever 129 can be expressed by:

$Fx = \{Ph \cdot A_3 - F_B + S_0(L_2/L_1)(K_A + K_B)\} \cdot L_2/L_1$.

Figure 3:
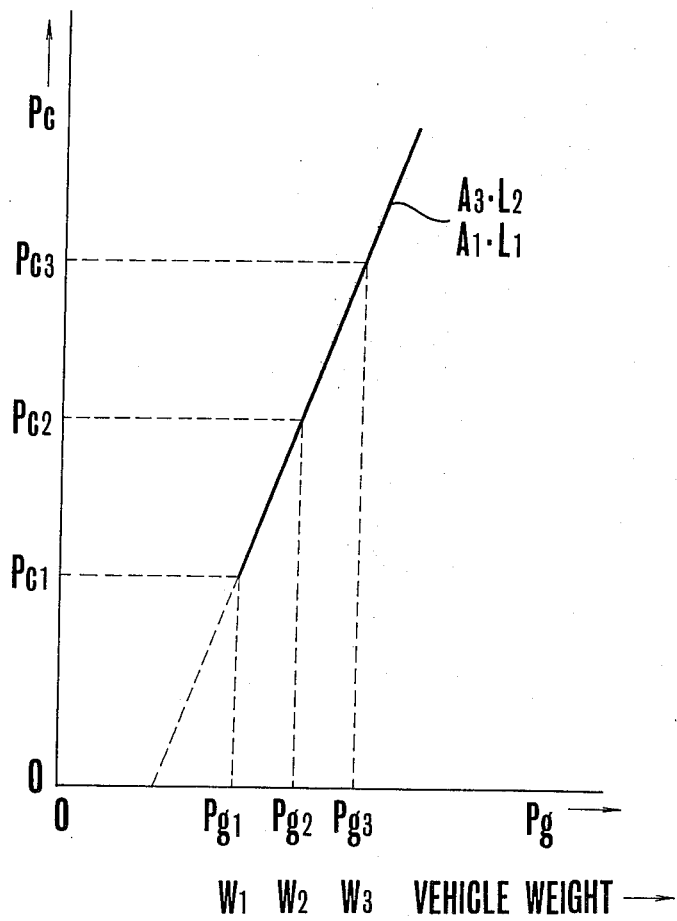
FIG. 3 is a graphic representation showing the characteristic of the second embodiment.

Then, since, as mentioned in the foregoing, the fluid pressure break point value Pc of the proportioning valve mechanism is $Pc = Fx/A_1$, the break point value Pc is multiplied at a rate of $A_3 \cdot L_2/A_1 \cdot L_1$ relative to the fluid pressure Ph which is sealed within the adjusting fluid chamber 121. An example of multiplying the break point value Pc in accordance with this embodiment example is as shown in FIG. 3.

Such being the structural arrangement of this embodiment, the rate of multiplying the break point value Pc is determined by the magnitude of $A_3 \cdot L_2$ and $A_1 \cdot L_1$. The initial spring force $F_A$ of the control spring 124 and the spring constant $K_A$ thereof can be set small by making the diameter of the adjusting piston 122 smaller. This permits reduction in size of the device. Besides, since the volume of the adjusting fluid chamber 121 then becomes smaller, this also permits reduction in the required quantity of the brake fluid. Further, in the case of this embodiment, the hold spring 126 is always under a predetermined loaded condition irrespective of the compressed state of the control spring 124.

Figure 4:
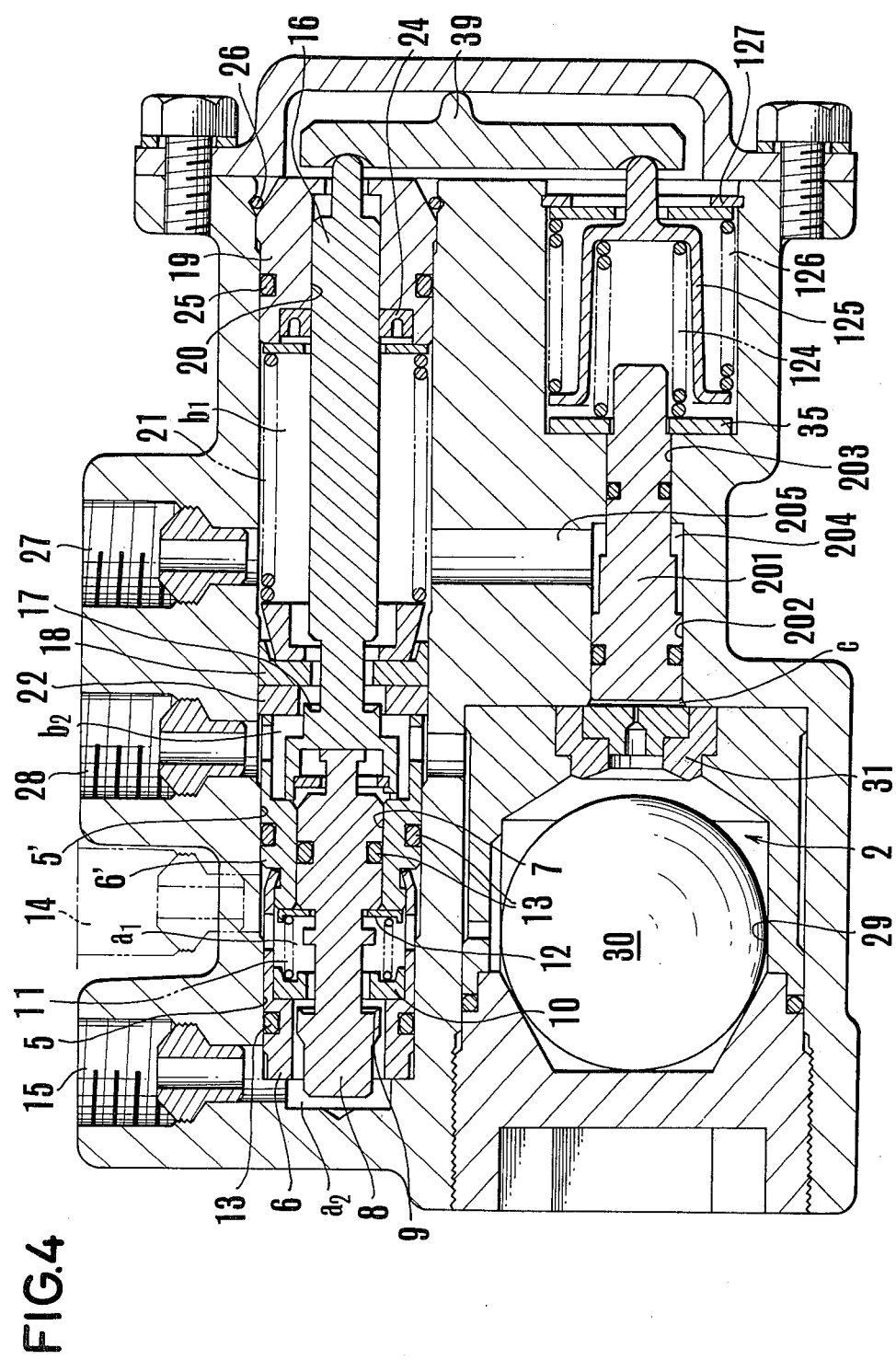
FIG. 4 is a longitudinal view showing a third embodiment of the invention.

A third embodiment example of the invention is as shown in FIG. 4. In this embodiment, the proportioning valve action mechanism is arranged in the same manner as in the first embodiment shown in FIG. 1. The springs 124 and 126 are arranged in the same manner as in the second embodiment which is shown in FIG. 2. Since they are indicated by the same reference numerals as those used in the preceding embodiments, description of them are omitted here.

A feature of this embodiment lies in that: the adjusting piston 201 is arranged to be slidable within stepped cylinders 202 and 203; and an annular chamber 204 which is formed round a smaller diameter part of the adjusting piston 201 is arranged to communicate with a master cylinder through a passage 205 and an input chamber $b_1$. This arrangement gives the following advantage:

During sudden brake application, even if there is produced an impact pressure by a high rate of rise of the brake fluid pressure, the fluid pressure break point value Pc is prevented from coming to exceed a setting value, because the adjusting piston is arranged to have fluid pressure exerted on both sides thereof and is never moved by such an impact pressure.

What is claimed is:

1. A deceleration sensing type fluid pressure control device for a vehicle brake system, comprising in combination:

a valve body having a first end and an oppositely disposed second end;

a proportioning action mechanism located within said valve body and including an axially extending control piston with the axis thereof extending in the direction between the first and second ends of said valve body, said action mechanism arranged for varying the degree of reduction of output fluid pressure from input fluid pressure in relation to a load imposed on said control piston;

an axially extending adjusting piston located within said valve body with the axis thereof extending in the direction between the first and second ends of said valve body and spaced laterally from the axis of said control piston;

passage means interconnecting the input fluid pressure of said action mechanism with one end of said adjusting piston;

a swaying lever located at the first end of said valve body and extending transversely of the axis of said control piston and adjusting piston, said lever having a first end and a second end and a stationary fulcrum spaced between said first and second ends thereof, said lever being in engagement with said control piston between said fulcrum and said first end of said lever;

a valve mechanism located within said passage means, said valve mechanism controlling flow of the input fluid pressure to said adjusting piston for closing flow thereto when the deceleration of the vehicle reaches a predetermined value; and spring means in contact with said lever on the opposite side of said fulcrum from said control piston and including a control spring extending between said adjusting piston at a location spaced from the location where the input fluid pressure contacts said adjusting piston and said lever with said spring means contacting said lever between said fulcrum and the second end thereof, and said control spring arranged to impose said load on said control piston via said lever.

2. A fluid pressure control device according to claim 1, wherein said spring means includes a hold spring which biases said adjusting piston in the direction toward the second end of said valve body.

3. A fluid pressure control device according to claim 1, wherein the distance between the point of contact of said control piston with said lever and said fulcrum is different from the distance between the point of contact of said spring means with said lever and said fulcrum.

4. A fluid pressure control device according to claim 1, wherein said spring means includes a spring case interposed between the second end of said lever and said control spring, and a hold spring extending between said spring case and said valve body for counteracting the biasing action of said control spring.

5. A fluid pressure control device according to claim 1, including stepped cylinders located within said valve body said control piston having a stepped shape and being slidably displaceable within said stepped cylinders, and a chamber encircling said control piston and arranged to be connected to the fluid pressure source.

* * * * *